Patented Dec. 25, 1945

2,391,737

UNITED STATES PATENT OFFICE 2,391,737

LEAK SEALING COMPOUND

Arthur C. Pabst, Douglaston, Long Island, N. Y., assignor to Socony-Vacuum Oil Company, Incorporated, a corporation of New York No Drawing. Application June 24, 1942, Serial No. 448,293

2 Claims. (Cl. 106—33)

This invention is directed toward the development of a compound for sealing leaks in containers such as automobile radiators, engine cooling jackets, steam boilers and the like.

In operating water cooling or water heating systems, it is frequently necessary to provide a method for sealing leaks without costly shutdowns and radical repairs such as welding, riveting and calking. A number of "stop leak" products have been known under proprietary names. Some of them operate on the principle of depositing a sealing film on the leaky spot from inside of the vessel, and some operate on the principle of forming a porous deposit on the leaky spot. Part of the liquid seeps slowly through this porous cake and sets into a solid crust on the outside of the vessel. The hardened plug may also extend into the crack or hole in the wall of the vessel. Stop leak compounds usually consist of aqueous or alcoholic-aqueous solutions of materials capable of setting into a solid, and some fibrous or granular material suspended in the solution. Sodium silicate, dispersible gums of different origin, molasses and similar materials have been used as binder, and sawdust, short fibrous asbestos, paper pulp are representative of the suspended solids.

I have discovered that the raw calcium salt of ligno-sulfonic acid usually obtained as a waste product of kraft paper manufacture and sometimes known under the trade name of "Lignone," is an excellent material for use in the stop leak compounds. Upon evaporation of water, it forms a gum-like, tough, and durable seal in and around the leak. I prefer to use an aqueous solution of "Lignone" with ground asbestos or similar short fibrous material.

Example

I give below an example illustrating my invention together with a composition which is widely used commercially.

| Product | New composition | Old composition |
|---|---|---|
|  | Per cent by weight | Per cent by weight |
| Gambier gum | | 30.00 |
| Lignone (60% solids) | 50.00 | |
| Ground asbestos | 3.00 | 3.00 |
| Isopropyl alcohol | | 16.75 |
| Water | 47.00 | 50.25 |

The method of manufacture is simple, in that "Lignone" is diluted with water and ground asbestos added under stirring.

I have been using the following laboratory test for the evaluation of stop leak compounds. A hole 0.072 in. in diameter is punched in the bottom of a one pound tin can as used for automobile polishing wax, 25 grams of the stop leak compound under investigation is diluted with 475 grams of water, and, after thorough mixing, are poured into the above can. The amount of liquid remaining in the can is taken as a measure of its leak sealing properties.

As applied to the above two formulae, the results of my tests were as follows:

|  | New compound | Old compound |
|---|---|---|
|  | Cc. | Cc. |
| Start of test | 500 | 500 |
| Amount of liquid left after stoppage of the leak | 465 | 470 |

While it is true that some of the old formulae of stop leak compounds did not contain alcohol, the best known materials did contain this more expensive solvent. The use of "Lignone" makes the addition of alcohol unnecessary. It may be added that "Lignone" is a cheap by-product available in quantities immeasurably larger than required for stop leak compounds.

The composition may vary within certain limits while still being capable of effecting a proper action. For example, the apparent limits for concentration of the salt of ligno-sulphonic acid range from about 6% to about 70.0%, and that of the fibrous filler from about 1% to about 20.0%. The thinnest compositions of course are those designed for use "as is," while the more concentrated ones are designed for addition to the water already in the cooling system.

While I have used "Lignone" in the above example, any alkaline earth salt of lignosulfonic acids derived either as by-product from paper manufacture or from any other sources, will be a satisfactory component of a stop leak compound, capable of forming a hard binder in and around the leaky spot. As fillers, equivalent to ground asbestos, I may use any other short fibrous grades of asbestos, rock wool, glass fibre, paper pulp, wood flour and the like.

I claim:

1. A water dispersible radiator stop-leak composition for use in automotive cooling systems and the like, comprising a calcium salt of ligno-sulphonic acid and ground asbestos, said salt having approximately 60% solids and the composition containing said constituents substantially in the proportions of approximately 50 parts calcium salt and approximately 3 parts ground asbestos.

2. A water dispersible radiator stop-leak composition for use in automotive cooling systems and the like comprising non-aqueous constituents consisting of approximately 50 parts of an alkaline earth salt of ligno-sulphonic acids having approximately 60% solids and approximately 3 parts of a filler selected from a class consisting of ground asbestos, short fibrous grades of asbestos, rock wool, glass fiber, paper pulp and wood flour.

ARTHUR C. PABST.